United States Patent [19]
Gordon et al.

[11] Patent Number: 6,026,749
[45] Date of Patent: Feb. 22, 2000

[54] MULTIPLE BASE PROPELLANT WITH COMBUSTION INHIBITOR

[75] Inventors: Stuart Gordon, Kidderminster; Geoffrey Ian Evans, Malvern, both of United Kingdom

[73] Assignee: Imperial Metal Industries (KYNOCH) Limited, Birmingham, United Kingdom

[21] Appl. No.: 05/876,259

[22] Filed: Feb. 3, 1978

Related U.S. Application Data

[63] Continuation-in-part of application No. 05/469,069, May 10, 1974, abandoned, and application No. 05/469,070, May 10, 1974, abandoned.

[30] Foreign Application Priority Data

May 11, 1973 [GB] United Kingdom .................. 22678/73
May 11, 1973 [GB] United Kingdom .................. 22679/73

[51] Int. Cl.⁷ .................................................. C06B 45/00
[52] U.S. Cl. .................................. 102/290; 149/2; 149/9; 149/97
[58] Field of Search ..................................... 102/103, 290; 264/3 R; 149/2, 9, 97

[56] References Cited

U.S. PATENT DOCUMENTS

| | | | |
|---|---|---|---|
| 2,858,289 | 10/1958 | Bohn | 102/290 |
| 3,636,881 | 1/1972 | Godfrey | 102/290 |
| 3,714,047 | 1/1973 | Marion | 102/290 |
| 3,793,099 | 2/1974 | Duerksen et al. | 149/19.4 |
| 3,948,697 | 4/1976 | Flanagan et al. | 102/290 |
| 3,991,565 | 11/1976 | Gordon et al. | 102/290 |
| 4,034,676 | 7/1977 | Daune | 102/290 |
| 4,536,235 | 8/1985 | Lelu et al. | 102/290 |
| 4,638,735 | 1/1987 | Lelu et al. | 102/290 |
| 4,654,093 | 3/1987 | Bolinder | 102/290 |

FOREIGN PATENT DOCUMENTS 1301296  12/1972  United Kingdom .

*Primary Examiner*—Edward A. Miller
*Attorney, Agent, or Firm*—Pillsbury Madison & Sutro LLP

[57] ABSTRACT

A combustion inhibiting composition for use in conjunction with a solid, gas-generating charge, the composition comprising an organic polymeric material containing an oxygen-containing organic filler compatible with said polymeric material, the oxygen to carbon atom ratio of the composition being at least 1:3.

7 Claims, No Drawings

MULTIPLE BASE PROPELLANT WITH COMBUSTION INHIBITOR

This This application is a continuation-in-part of application Ser. No. 469,069 filed May 10, 1974, now abandoned, and application Ser. No. 469,070 also filed May 10, 1974, now abandoned.

FIELD AND BACKGROUND OF THE INVENTION

This invention relates to combustion inhibitors for solid gas-generating compositions, especially but not exclusively solid propellants for rocket motors. Solid propellant rocket motors include a charge of propellant, an inhibitor on certain parts of the charge to control the area of burning surface, and an outer case. The inhibitor is used to control locally the burning area of the propellant so that the charge burns in the desired geometrical manner. The inhibitor needs to be chemically and physically compatible with the charge and may be completely or partially consumed during the firing of the rocket motor.

If a rocket motor emits smoke, the trail can betray the firing point of the missile and its trajectory. Further, exhaust smoke obscures the target and missile from the person firing the missile which is particularly disadvantageous if the missile is being visually guided along the line of sight to its target. Thus, frequently, one of the major requirements of a rocket motor is that stoke emission during combustion be as low as possible. As regards the propellant itself, this condition is met by the use of multiple base propellants, for example double base propellants comprising nitrocellulose and nitroglycerine or other liquid nitric acid ester which may contain additives such as chemical stabilisers, plasticisers and/or ballistic modifiers. Combustion of inert parts, largely the charge inhibitor, often, however, prevents the achievement of a "smokeless" exhaust.

Additionally, gas generating compositions, for example propellant charges or power cartridges, are widely used for mechanical operations and in such circumstances smoke condensate may be a nuisance because it can foul the area into which it is discharged and cause interference with valve mechanisms and moving surfaces.

SUMMARY OF THE INVENTION

We have now discovered that by using relatively highly oxygenated combustion inhibitors, substantial smokelessness of propellant systems may be achieved whilst the inhibitor still functions quite satisfactorily.

The present invention provides a combustion inhibiting composition for use in conjunction with a solid gas-generating charge, especially a double base rocket propellant charge, the composition comprising an organic polymeric material containing an oxygen-containing organic filler compatible with the polymeric material, the oxygen-:carbon atom ratio of the composition being at least 1:3.

DESCRIPTION OF PREFERRED EMBODIMENTS

The compositions of the present invention are especially beneficial for use with double base rocket propellants for which smokelessness is often highly desirable. It is essential, for proper functioning of the rocket propellant, that the inhibitor at all times remains in combustion inhibiting contact with the propellant charge. To this end, because rockets are very likely to encounter during transport and storage a wide range of different temperatures which results in contraction and expansion of their various components, it is advantageous for the inhibitor to be able to deform in concert with expansion or contraction of the propellant charge. Advantageously, therefore, the inhibitor is deformable, preferably elastomeric, over a temperature range of −40° C. to +60° C.

More especially, therefore, the present invention provides a combustion inhibiting composition for use in conjunction with a solid gas generating charge, especially a double base rocket propellant charge, the composition comprising a deformable, especially elastomeric, organic polymeric material containing an oxygen-containing organic filler compatible with said polymeric material, the oxygen:carbon atom ratio of the composition being at least 1:3.

The oxygen:carbon atom ratio is preferably at least about 1:2.

A combustion inhibitor comprising a composition of the invention may be formed around the solid gas generating cage by one or other of several techniques, depending on the nature of the inhibitor composition. For example, the inhibitor, which usually takes the form of a restively thin sheath around the cylindrical surface and one end of a cylindrical gas generating charge, for example a propellant, (that is to say the inhibitor is usually cup-shaped), may be formed in situ by casting a flowable composition precursor around the charge, may be preformed and applied to a preformed charge or may be preformed and the charge then cast in situ in the inhibitor sheath, the latter being in or acting as a mould. Where the inhibitor is to be cast in situ around the charge, for example a double base propellant grain, the inhibiting composition must of course initially be flowable. Usually, therefore, when using a casting technique, one or more liquid monomers, polymers or prepolymers usually containing a polymerisation catalyst and optionally other additives such as plasticisers, having dispersed therein the organic filler or fillers, are cast around the charge and are then cured. As the castable composition needs initially to be flowable, the amount of filler dispersed therein will be limited. Accordingly, in such cases it may be necessary, in order to obtain the required oxygen:carbon atom (O:C) ratio, to choose one or more monomers, polymers or prepolymers which are themselves sufficiently oxygenated that the final inhibitor composition will have the required overall O:C ratio. Further, the particle size of the filler is preferably as small as possible so as to obtain an acceptable viscosity of the castable composition at the filler loadings used. In the case where the inhibitor is preformed, the composition must, of course, be such that it is processable into the preformed inhibitor. Again, therefore, the amount of filler will be limited and the polymeric material in that case also preferably itself contains oxygen atoms. Needless to say, the filler must be compatible in all respects with the polymeric material and the expert will be able readily to determine whether a particular filler/polymer combination is suitable from the view-point of compatibility and processability. In any event, in order to achieve the highest possible overall O:C ratio, consistent of course with the inhibitor possessing the usual necessary properties familiar to those skilled in the art, it is preferred that the polymeric material itself contains a significant amount of oxygen. As a preferred embodiment, therefore, the present invention provides a combustion inhibiting composition comprising an organic, oxygen-containing, deformable, especially elastomeric, polymeric material containing an oxygen-containing organic filler, the oxygen:carbon atom ratio of the composition being at least 1:3.

Generally speaking, the polymeric material is preferably oxygen-containing, has as few hydrocarbon branch groups or branch chains as possible and is substantially devoid of carbon—carbon unsaturation, whether aliphatic or aromatic. Further, the or each monomer, polymer or prepolymer from which the final polymeric material is derived is preferably of a relatively low molecular weight, ie has a relatively short chain length.

The organic polymeric material is preferably selected from the groups consisting of (a) copolymers of one or more ethylenically unsaturated hydrocarbons with at least one comonomer selected from methacrylic acid, methyl methacrylate, acrylic acid, methyl acrylate, and B-hydroxyethylmethacrylate and (b) polyurethanes containing units derived from a polyetherpolyol or a polyester-polyol and a polyfunctional isocyanate. The homopolyacrylates are examples of another preferred class of polymeric materials. As already indicated, for application to propellant grains, there are preferably chosen polymeric materials from these groups that are elastomeric. Polymeric materials selected from group (a) are preferably derived from one or more monoethylenically unsaturated aliphatic hydrocarbons, such as ethylene, and one or more, preferably two or more, of said comonomers.

Preferred copolymers of the group (a) may contain for example up to 75% by weight of units derived from, for example, ethylene, but lower amounts are preferred. However, it is usually necessary to bear in mind which polymers of that sort are commercially available and ideal polymers containing only a minor amount of ethylene-derived units are in fact not readily available. On the other hand, too low an ethylene-derived unit content may reduce the rubbery properties of the polymer. Inhibitor compositions comprising a polymer of the type (a) are preferably preformed into the inhibitor.

Polymeric materials selected from the group (b), ie polyurethanes, preferably contain units derived from a relatively low molecular weight straight chain aliphatic polyether- or polyester-polyol, preferably having a molecular weight of less than 1 000, and an aliphatic polyisocyanate, for example a diisocyanate, preferably also having a relatively low molecular weight, for example less than 500, in order to produce less smoke than would be the case with an isocyanate which is aromatic and/or is of relatively high molecular weight. An example of a preferred commercially available polyisocyanate is 2,2,5-trimethyl-hexamethylene-1,6-diisocyanate. An alternative, but less preferred, polyisocyanate is 4,4'-diphenylmethanediisocyanate available commercially from ICI as ICI Suprasec DNC. Polyetherpolyols are preferred because the resulting ployurethane has less tendency to absorb nitroglycerine from double base propellants. The tendency to nitroglycerine absorption may be further reduced by applying a barrier coat to the propellant grain prior to application of the inhibitor.

The polyurethanes are preferably cross-linked and this may be facilitated by means known in the polymer art, for example by using a triol instead of a diol. Cross-linking of the polyols with isocyanates may be carried out by known methods. The formation of the polyurethanes will usually be carried out in the presence of a catalyst, for example phenyl mercuric acetate. Inhibitor compositions of the type (b) are preferably formed in situ around a propellant charge.

It will be appreciated that, whilst the polymeric material itself may have a relatively high oxygen:carbon atom ratio, it is necessary to incorporate an oxygen-containing organic filler in the polymeric material to increase the overall oxygen:carbon atom ratio to or above the desired value. However, other factors being equal, it will not be necessary to add as much filler to polymeric materials containing units of aliphatic structure as to polymeric materials containing units of aromatic structure.

The organic filler (or fillers) in the inhibitor composition is such that it yields molecular or atomic oxygen at elevated temperatures and is preferably chosen from saturated aliphatic compounds having an oxygen:carbon atom ratio that is as high as possible. Preferred fillers have an O:C ratio of about 1:1 or higher. There may be especially mentioned, for example, cellulose, carbohydrates, oxamide, polyoxymethylene, urea formaldehyde, urea oxalate and tartaric acid. Oxamide is particularly preferred. Exposure of the filled inhibitor to the combustion of the propellant charge in a rocket motor chamber, for example, thereby results in a combustion product that is substantially wholly gaseous.

The polymeric material and the filler preferably contain only carbon, hydrogen, oxygen and optionally nitrogen atoms which, at the very high temperatures encountered in, for example, rocket motors can combine to give a variety of gaseous materials.

If desired, plasticisers may be used to make a softer product, in which case they preferably have a molecular weight of less than 500 and are preferably aliphatic with a relatively high oxygen:carbon atom ratio. Examples of useful plasticisers for polyurethane-based inhibitors of the invention are triethyl citrate which has a molecular weight of 212 and triacetin which has a molecular weight of 184.

Typically, the thickness of the inhibitor sheath is of the order of 1 mm.

The following examples illustrate the invention. In the examples, the parts are by weight.

EXAMPLE 1

A combustion inhibitor composition precursor is prepared as follows.

There are mixed together 100 parts of ICI Dalto Cast 2, a polyether triol of the formula

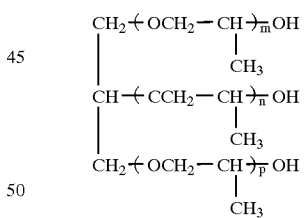

in which m+n+p is 5 to 6 and the molecular weight of which is 410, 77 parts of 2,2,5-trimethyl hexamethylene-1,6-diisocyanate, 40 parts of dibutyl carbitol formal plasticiser of the formula $(C_4H_9OC_2H_4OC_2H_4O)_2CH_2$, 0.2 parts phenyl mercuric acetate as the polymerisation catalyst and
88 parts of oxamide of formula $(CONH_2)_2$ as the filler.

The mixture is made up in liquid form at room temperature and is cast in a mould round a nitrocellulose/ nitroglycerine double base propellant grain before the mixture solidifies. Before casting, a barrier coat may be applied to the propellant grain to prevent nitroglycerine diffusing into the inhibitor. The inhibitor sheath composition has an O:C ratio of about 1:2.3.

EXAMPLE 2

Ethylene, methacrylic acid and methyl methacrylate are copolymerised. The proportions are 15% of methacrylic acid,

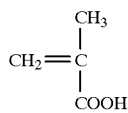

+15% methyl methacrylate

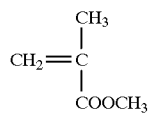

+70% ethylene $CH_2=CH_2$.

Alternatively the above copolymer can be modified by copolymerisation with the additive B-hydroxyethyl methacrylate

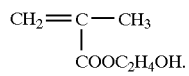

The above copolymer or modified copolymer can be loaded up to a level of 3:1 or higher, by weight, of filler to copolymer. The filler and copolymer may be milled together to form a thoroughly mixed crepe. The mix of milled filler/polymer crepe is formed essentially by melting the copolymer mixture and mixing in the filler which is encapsulated by the molten copolymer mixture. The molten copolymer and filler mixture is thereby formed into slabs, which can be used for moulding or pressing sheets. The product of the above method of mixing can also be granulated and re-processed as the feed stock for extrusion of tubes or sheet.

In an alternative method of forming the mixture, the copolymer and fillers are separately ground to fine powder, and the powder mix is then extruded into tubes or sheet by conventional plastic screw extruder techniques. The sheets or tubes can then be moulded to any desired shape to provide inhibitors. More particularly by admixing 70 parts by weight of polyoxymethylene filler with 30 parts of the ethylene/methacrylic acid/methyl methacrylate copolymer, there is obtained a composition suitable for use as a combustion inhibitor having an O:C ratio of about 1:2.1.

EXAMPLE 3

In a third example of the invention, 20 parts of acrylic acid

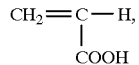

15 parts methyl acrylate

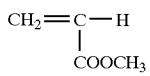

and 65 parts of ethylene $CH_2=CH_2$ are conolymerised. To 100 parts of the copolymer mixture is added 50 parts polyoxymethylene $(CH_2O)_n$.

The components are blended together and the blend is then pressed at 130° C. to give sheets or slabs. Alternatively, any other of the processing methods described in Example 2 may be used. The composition has an O:C ratio of about 1:3.

The amount of copolymerisation may be adjusted to alter the physical properties of the solid inhibitor, for example the rubberiness of the inhibitor.

EXAMPLE 4

A pourable inhibitor composition precursor is prepared by mixing together 42.7 parts by weight of ICI Dalto Cast 2 (details of which are given in Example 1), 37 parts by weight of 2,2,5-trimethyl hexamethylene diisocyanate, 57.2 parts by weight of finely divided oxamide and a small amount of phenyl mercuric acetate catalyst.

An inhibitor sheath having a thickness of about 1 mm is then formed around an NC/NG double base propellant grain as described in Example 1. The final inhibitor composition has an O:C ratio of about 1:2.1.

An inhibitor composition of the invention may be used for solid propellants other than double base propellants, eg composite propellants.

However, one of the advantages of the inhibitors of the present invention when used with double base propellants in the particular form described above is that not only is the system virtually smokeless during combustion at elevated pressures normal in rocket motors, but it is also smokeless or nearly so in the after-burn condition of the motor including pressure decay period in the combustion chamber. This is of course a significant advantage.

In the case of inhibitors comprising a polymeric material of the type (a), if a high erosion resistance, or mechanical property such as high modulus of elasticity or high strength is required, then a greater proportion of filler up to 300 parts by weight or beyond compared to 100 parts by weight of polymer can be used.

In a further method of manufacturing an inhibitor comprising a polymer of the type (a), the copolymer and filler material, both in powder form, are pre-blended, and are then fed into a plastics screw-type extruder or extrusion press. From this, there is extruded the copolymer composition, either in the physical form that is required, eg tube or sheet, or in for example sheet form for further pressing to the required shape.

The compositions of the present invention find application in a rocket motor combustion chamber for duties in addition to that of combustion inhibition. Thus, appropriate organic, oxygen-containing fillers may be chosen so as additionally to impart special properties to the inhibitor.

The properties which can be obtained in the case of filled ethylene copolymers of the type (a), are illustrated by the compositions having filler contents and physical properties given in the following table, all being based on a copolymer of 70 wt %. ethylene, 15 wt % methacrylic acid and 15 wt % methyl methacrylate.

TABLE

| Filler | Filler % content | Tensile strength in meganeutons/m$^2$ | Elongation % |
|---|---|---|---|
| Polyoxymethylene | 75.00 | 4.40 | 2.20 |
| Oxamide | 40.00 | 17.50 | 417.00 |
| Oxamide | 75.00 | 9.30 | 8.00 |
| — | 0.00 | 38.00 | 490.00 |

Again in the case of compositions comprising a polymer of the type (a), it is also possible to select a thermoplastic filler material, for example polyoxymethylene, and then to extrude or mould at an appropriate temperature. If the temperature is above the melting point of the filler material, then there is produced a co-moulding which largely displays the physical properties of the filler material in conjunction with some rubbery properties arising from the copolymer. If the temperature is below the filler melting point, then there is obtained largely the rubbery properties of the copolymer. This applies to the use of any thermoplastic filler material. As an example, there was prepared the copolymer 70 wt % ethylene, 15 wt % methacrylic acid and 15 wt % methyl methacrylate, and this was filed with 75%, ie 75 parts per hundred copolymer, of polyoxymethylene by mixing the two together in powder form. When the mixture was extruded at 150° C., there was produced a filled thermoplastic rubber largely showing the properties of the copolymer. On the other hand, when the mixture was moulded at 170° C., there was produced a co-moulding in which the tensile strength was doubled.

The really important feature of the combustion inhibitors of the invention is their negligible smoke output during burning. The inhibitors described above in the examples were tested for smoke production by being applied to 150 mm diameter cast double base solid propellant charges which were then fired with a burning time of 26 seconds. The obscuration on polarised light transmission by the exhaust fumes in the direction along the axis of the rocket motor exhaust was then measured using a photometer. Obscurations of from 0 to 10% were obtained. In a comparative test using an inhibitor of standard cellulose acetate base form the percentage obscuration was about 80%. These tests clearly show the important reduction in smoke production using the inhibitor compositions of the examples.

Another advantage of the inhibitors is that they are readily formable. In the case, for example, of polyurethane containing inhibitors, the composition may initially be in the form of a castable liquid and be used to "pot" grains of propellant. In the case of acrylate-based inhibitors, they may be preformed inhibitor components into which the propellant can be subsequently cast.

As already mentioned, the inhibitors of the present invention are especially useful for application to double base propellants because they may be formulated to have relatively low nitroglycerine-absorbing properties. Their low density, usually lying in the range 1.1 to 1.2 depending on the filler used, their good gas permeability and their good adhesive properties also render them very suitable for use as combustion inhibitors. Further, their mechanical properties are readily adjusted by selection of the polymer itself, of the filler and of optional additives. Accordingly, their mechanical properties can readily be matched to those of a substrate such as a solid propellant charge.

We claim:

1. A double base propellant charge having in intimate contact with at least a part of its surface an elastomeric sheath comprising about 30 parts by weight of a copolymer having dispersed therein about 70 parts by weight of a filler selected from polyoxymethylene and oxamide, said copolymer comprising about 70% by weight of units derived from ethylene, about 15% by weight of units derived from methacrylic acid and about 15 parts by weight of units derived from methyl methacrylate.

2. A double base propellant charge according to claim 1 wherein said sheath has been preformed into a cup or other shaped body into which the propellant has subsequently been cast.

3. A solid multiple base gas generating charge having on at least part of its surface a layer of a substantially wholly organic combustion inhibiting composition comprising an organic polymeric material containing an oxygen-containing organic filler compatible with said polymeric material, the overall oxygen to carbon atom ratio of the composition being at least 1:3, wherein the polymeric material contains only atoms selected from the group consisting of carbon, hydrogen, oxygen and nitrogen atoms and comprises a copolymer of at least one monoethyleneically unsaturated hydrocarbon with at least one comonomer selected from the group consisting of methacrylic acid, methyl methacrylate, acrylic acid, methyl acrylate and B-hydroxyethylacrylate.

4. A gas-generating charge according to claim 3 wherein said unsaturated hydrocarbon is ethylene.

5. A gas-generating charge according to claim 4 wherein the polymeric material contains up to 75% by weight of units derived from ethylene.

6. A gas-generating charge according to claim 5 wherein the polymeric material is a copolymer comprising about 70% by weight of units derived from ethylene, about 15% by weight of units derived from methacrylic acid and about 15% by weight of units derived from methyl methacrylate.

7. A gas-generating charge according to claim 5 wherein the polymeric material is a copolymer comprising about 65% by weight of units derived from ethylene, about 20% by weight of units derived from acrylic acid and about 15% of units derived from methyl acrylate.

* * * * *